(12) United States Patent
Huang et al.

(10) Patent No.: US 6,828,719 B1
(45) Date of Patent: Dec. 7, 2004

(54) ILLUMINATOR CAPABLE OF CLEANING AIR

(75) Inventors: Chu-Chun Huang, Hsin Chu Hsien (TW); Wen-Hu Cheng, Hsin Chu Hsien (TW); Swi Mu Lin, Taipei (TW)

(73) Assignee: Taiwan Fluorescent Lamp Co., Ltd., Taipei (TW)

( * ) Notice: Subject to any disclaimer, the term of this patent is extended or adjusted under 35 U.S.C. 154(b) by 15 days.

(21) Appl. No.: 10/441,206

(22) Filed: May 20, 2003

(51) Int. Cl.[7] .................................................. H01J 1/62
(52) U.S. Cl. ....................................... 313/486; 313/635
(58) Field of Search ................................ 313/485, 486, 313/487, 635

*Primary Examiner*—Vip Patel
(74) *Attorney, Agent, or Firm*—Rosenberg, Klein & Lee

(57) ABSTRACT

An illuminator capable of cleaning air is disclosed. The illuminator includes a transparent lamp envelope having two ends. A layer of glue body is adhered to inner surface of the lamp envelope. An amount of visible and UV light fluorescent powders are mixed in the layer of glue body. Electrode bases seal both ends of the lamp envelope. A photocatalytic gel film is coated on outer surface of the lamp envelope.

21 Claims, 6 Drawing Sheets

ILLUMINATOR CAPABLE OF CLEANING AIR

BACKGROUND OF THE INVENTION

1. Field of the Invention

The present invention relates to an illuminator capable of cleaning air.

2. Description of the Related Art

Illuminators such as fluorescent lamps for illuminating rooms, offices, or other working space are known in the art. After long-term usage, dusts or pollen in the air or other substances such as suspended organic particles from cigarettes or out-gassing chemicals usually adhere to the illuminators and thus cause significant reduction of lightness of the illuminators. Such unwanted substances presented in close air system of a building are also sources of so-called indoor air pollution, building-related illness, and "sick building syndrome" which have received increased attention over the last several years. The quality of indoor air can be many times worse than that of the outdoor air. Given the fact that many people spend as much as 90 percent of their time indoors, the health risk due to indoor air pollutants is a significant public health concern. Indoor air quality can affect people's health and can have economic and legal implications. For example, pollutants can cause or contribute to short- and long-term health problems, including asthma, respiratory tract infections, allergic reactions, headaches, congestion, eye and skin irritations, coughing, sneezing, fatigue, dizziness and nausea.

In light of foregoing, there is a strong need to provide an illuminator capable of cleaning air to prevent above-mentioned indoor air pollution problems and also lightness reduction problems.

SUMMARY OF THE INVENTION

Accordingly, one object of the invention is to provide an illuminator capable of cleaning air for decomposing airborne organic substances, eliminating odors, killing bacterium in the air.

It is another object of the present invention is to provide an illuminator capable of cleaning air with self-cleaning function.

Still another of the present invention is to provide an illuminator capable of cleaning air and providing soft lighting.

To achieve the se and other advantages and in accordance with the purposes of the present invention, as embodied and broadly described herein, the present invention provides an illuminator capable of cleaning air. The illuminator includes a transparent lamp envelope having two ends. A layer of glue body is adhered to inner surface of the lamp envelope. An amount of visible and UV light fluorescent powders are mixed in the layer of glue body. Electrode bases seal both ends of the lamp envelope. A photocatalytic gel film is coated on outer surface of the lamp envelope.

Other objects, advantages and novel features of the invention will become more clearly and readily apparent from the following detailed description when taken in conjunction with the accompanying drawings.

DETAILED DESCRIPTION OF THE PREFERRED EMBODIMENTS

Figure 1:
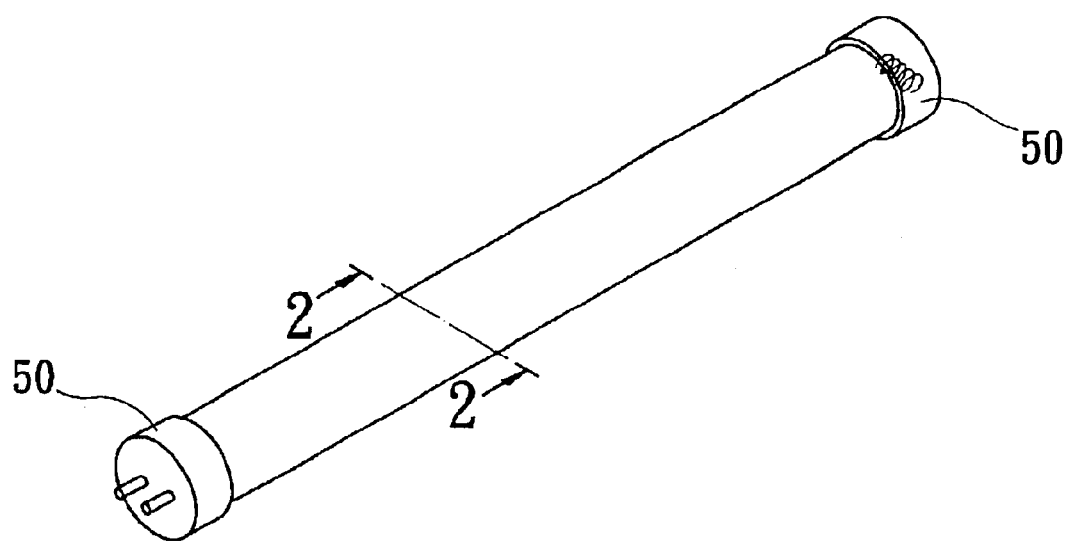
FIG. 1 is a schematic perspective view depicting an illuminator capable of cleaning air in accordance with the present invention.
Figure 2:
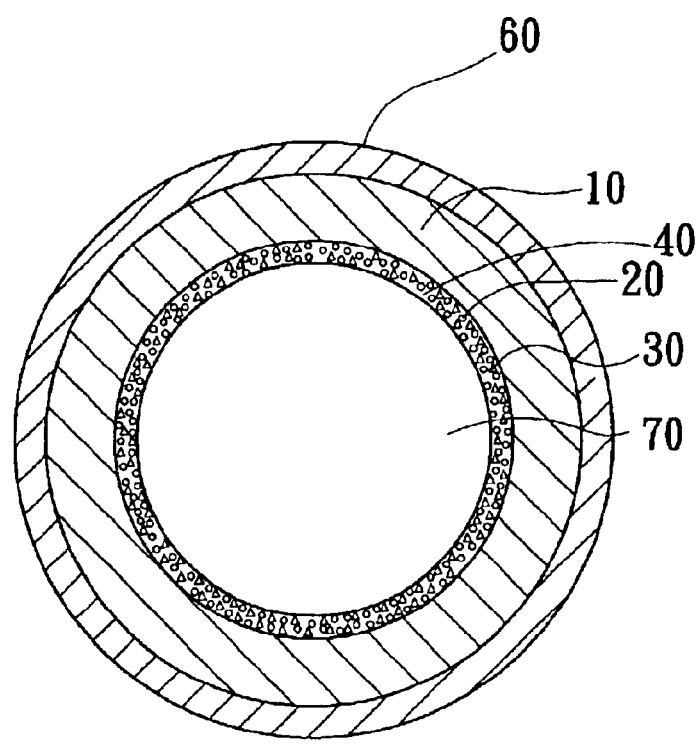
FIG. 2 is a schematic cross-sectional view of the illuminator along line 2—2 of FIG. 1.

The present invention pertains to an illuminating device capable of purifying air. Referring to FIG. 1 and FIG. 2, the illuminating lamp device according to one preferred embodiment of this invention comprises a transparent cylindrical lamp envelope 10 with a layer of glue body 40 adhered to the inner surface of the cylindrical lamp envelope 10. The layer of glue body 40 is blended with visible light fluorescent powders 20 and ultraviolet (UV) fluorescent powders 30 in advance. The lamp device is hermetically sealed by electrode bases 50 at both ends of the envelope 10. A photocatalytic gel film 60 is coated on the outer surface of the lamp envelope 10. It is one of the main features of the present invention that the photocatalytic gel film 60 can absorb UV light emitted by the lamp device and decompose the adsorbed substances. It is another feature of the present invention that the photocatalytic gel film 60 can be used to diffuse visible light for providing a more comfortable lighting.

The transparent lamp envelope 10 may be made of sodium calcium glass that will not block the UV light generated by the lamp device. The lamp envelope 10 has a wall thickness of about 0.3 mm to 1.2 mm. The UV light generated by the lamp device, more specifically, by the UV fluorescent powders 30, will penetrate through the wall of the lamp envelope 10. The formation of the glue body layer 40 involves the preparation of a sticky solution comprising the visible and UV light fluorescent powders, a small amount of excitation materials, and adhesion materials. The visible light fluorescent powder 20 may be selected from the group consisting of $Ca_{10}(PO_4)_6FCl$, Sb, Mn, $\alpha_5(PO_4)_3Cl$, Eu, $BaMg_2Al_{16}O_{27}$, $LaPO_4$, Ce, Tb, and $Y_2O_3$, wherein $\alpha$ includes Sr, Ca, and Ba. The UV light fluorescent powder 30 may be selected from the group consisting of $BaSi_2O_{17}$, $\beta 3Si_2O_7$, $SrB_4O_7$, Pb, Eu, $YPO_4$, and $\gamma Al_{11}O_{19}$, wherein $\gamma$ includes Sr, Mg, and Ba, and $\gamma$ includes Mg and Ba. The excitation material may be selected from the group consisting of Ba, Sr, Mg, SiO, Pb, Eu, BO, YPO, Ce, La, AlO, Fe, and Li. The adhesion material comprises butyl acetate, nitrocellulose, surfactants, pure water, and antifoam. After adding the visible and UV light fluorescent powders 20 and 30, the excitation material, the solution is stirred for 36 to 72 hours to produce a sticky solution having a viscosity of 12+1.5 sec. Preferably, the concentration of the visible light fluorescent powder 20 of the final solution is about 60% to 95% in weight. The concentration of the UV light fluorescent powder 30 of the final solution is about 5% to 40% in weight. The coating of the glue body layer 40 is known in the art. For example, the lamp envelope 10 with a cleaned inner surface is dipped in the above-mentioned adhesive solution. By controlling the leaving speed of the lamp envelope 10 from the surface of the solution, the fluorescent coating on the inner surface of the lamp envelope 10 may have a thickness of 1 micrometer to 1.5 micrometers. After removing the fluorescent coating on the outer surface of the lamp envelope 10, the coated lamp envelope 10 is subjected to a 500–600° C. thermal treatment for aging the fluorescent coating, thereby forming the glue body layer 40. After the formation of the glue body layer 40, the lamp device is hermetically sealed by electrode bases 50 at both ends of the envelope 10 for defining a sealed chamber 70 therein. Inert gases, rare-earth gases, and mercury vapor are then injected into the chamber 70.

Preferably, the photocatalytic gel film 60 comprises titanium dioxide ($TiO_2$). In some cases, the photocatalytic gel film further comprises one or more photocatalysts selected from the group consisting of $WO_3$, $SnO_2$, ZnO, and $Fe_2O_3$. Preferably, some noble metals such as Au, Pd, Pt, or Ag, and some transistion metals such as Mo, Nb, V, Ce, or Cr may be added to promote decomposition efficiency of the photocatalytic reaction. One-stage or two-stage dipping of the lamp envelope 10 within the prepared photocatalytic gel solution may be used to control the thickness of the photocatalytic gel film 60. Preferably, the thickness of the photocatalytic gel film 60 is between 0.1 micrometers and 1 micrometer. The particle size of the titanium dioxide is between 10 nm and 30 nm. It is worhty noted that the pH value of the prepared photocatalytic gel solution is between 1.0 and 3.0. To adjust the concentration of the photocatalytic gel solution, acetate solvent is used. At the final phase for the preparation of the photocatalytic gel film 60, the coated lamp envelope 10 is subjected to a drying process and followed by sintering.

Electrode structures mounted on the electrode bases 50 provide arc discharge and hot electrons. The accelerated electrons excite mercury molecules to generate UV light with a wavelength of 253.7 nm that irradiates the visible light fluorescent powders 20 to produce visible light with a wavelength of 380 nm or above. The visible light penetrates through the wall of the transparent lamp envelope 10, the photocatalytic gel film 60, and is scattered or diffused by the photocatalytic gel film 60, thereby generating softer lighting. The 253.7 nm UV light by the excited mercury vapor also irradiates the UV fluorescent powders 30 to initialize photoexcitation reactions and to generate 312 nm–380 nm UV light that penetrates through the wall of the lamp envelope 10 and then absorbed by the photocatalytic gel film 60. When light is absorbed by titanium dioxide ($TiO_2$), electrons and holes are produced in the materials. The holes move to the surface of the materials and decompose the adsorbed substances. Active electron and hole pairs also reacts with oxygen and water molecules in the air and thus generates free radicals such as hydroxyl radicals and positive hydrogen ion. Capitalizing on these reactive radicals and electron-hole pairs the toxic substances in environment can be effectively removed.

Figure 3:
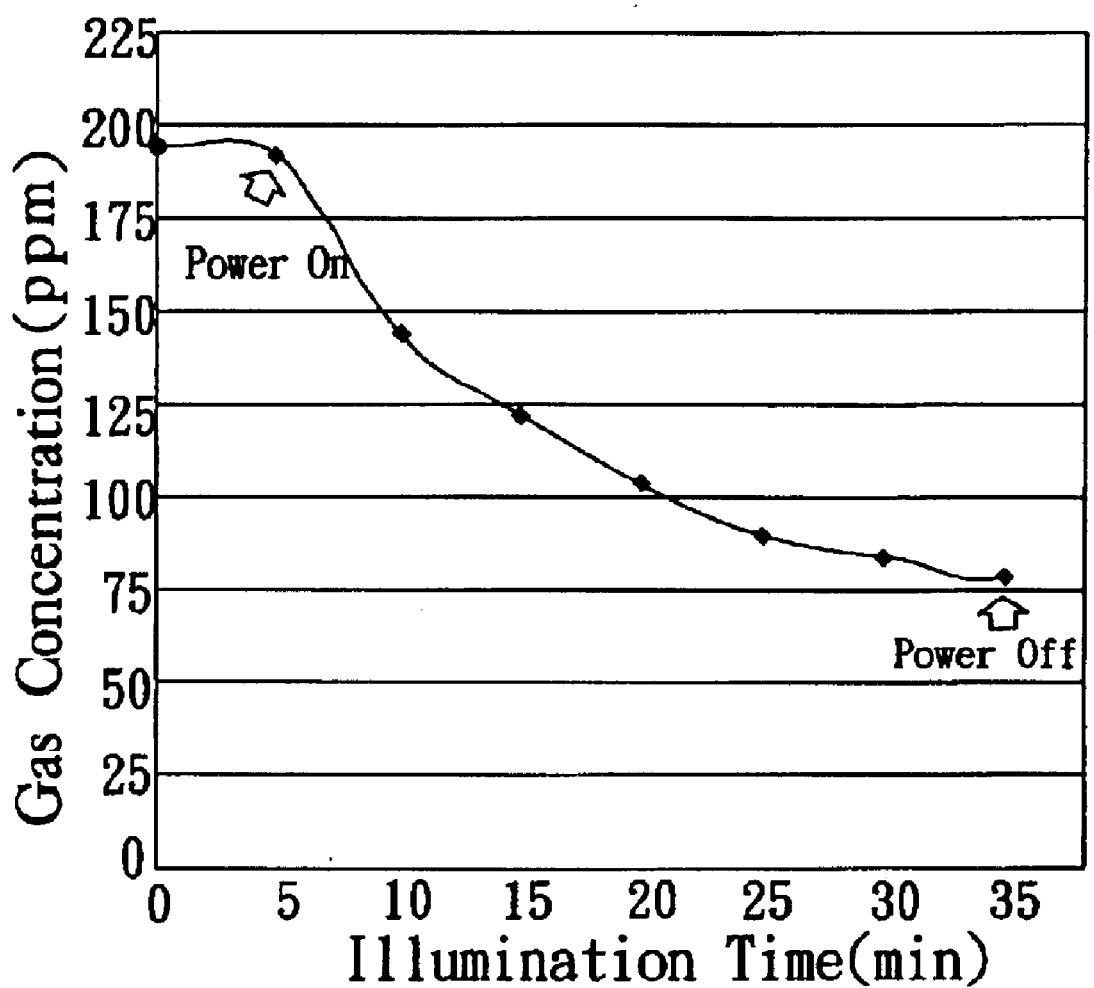
FIG. 3 is a plot presenting the butyl-acetate gas removal rate when using 1% UV fluorescent powder.
Figure 4:
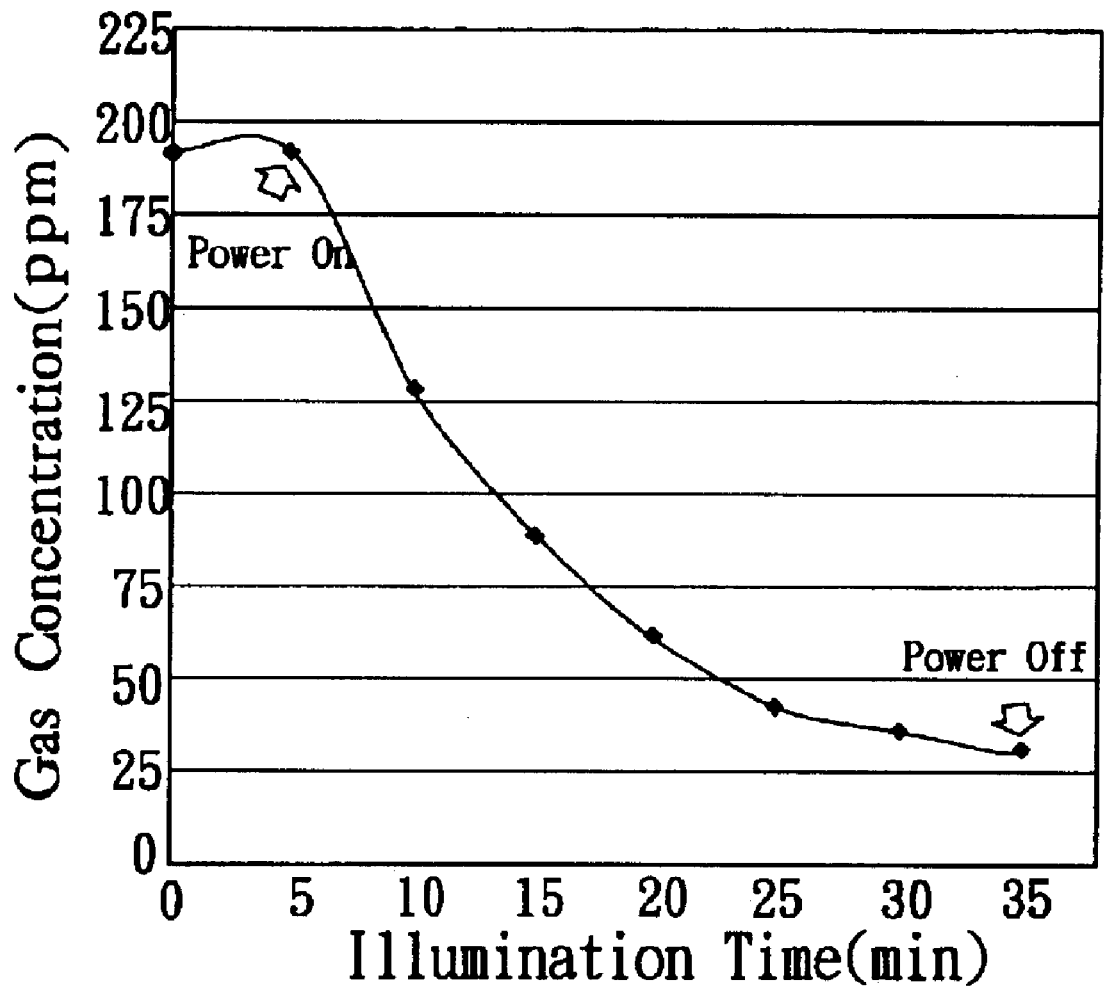
FIG. 4 is a plot presenting the butyl-acetate gas removal rate when using 5% UV fluorescent powder.
Figure 5:
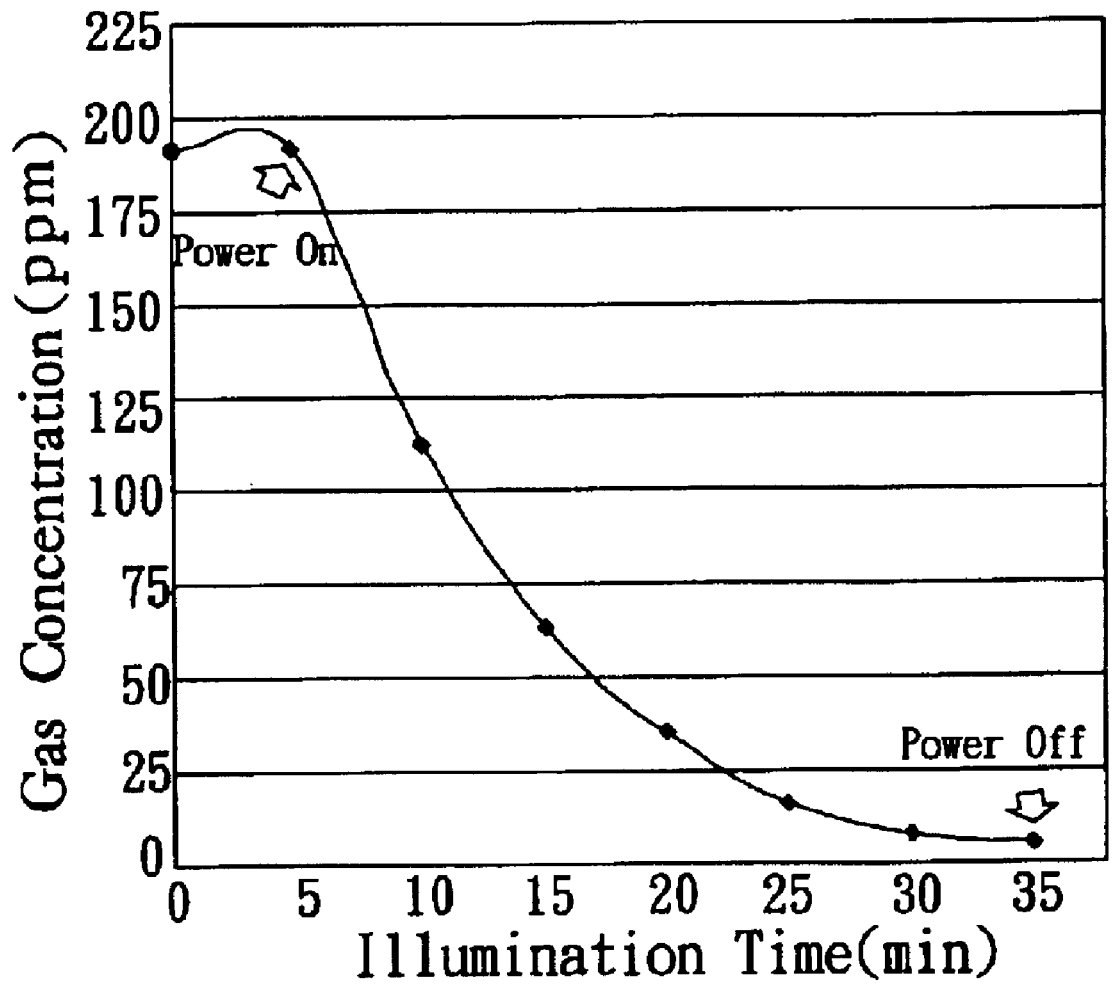
FIG. 5 is a plot presenting the butyl-acetate gas removal rate when using 10% UV fluorescent powder.

Experimental gas removal efficiency for 1%, 5%, and 10% UV fluorescent powder 30 are presented in FIG. 3 to FIG. 5, respectively. The experimental data are obtained by using a gas detector that is installed in a hermetically sealed vessel, in which an amount of gaseous butyl-acetate is injected in advance. The illuminator device of this invention is installed in the vessel. The power of the illuminator device is 40W. In this experiment, the butyl-acetate concentration in this vessel is 200 ppm (parts per million). As shown in FIG. 3, about 100 ppm of butyl-acetate is decomposed by the photocatalytic gel film 60 (with 1% UV fluorescent powder 30) coated on the lamp envelope 10 after 30 min irradiation. As shown in FIG. 4, about 160 ppm of butyl-acetate is decomposed by the photocatalytic gel film 60 (with 5% UV fluorescent powder 30) coated on the lamp envelope 10 after 30 min irradiation. As shown in FIG. 5, about 185 ppm of butyl-acetate is decomposed by the photocatalytic gel film 60 (with 10% UV fluorescent powder 30) coated on the lamp envelope 10 after 30 min irradiation. According to the above experimental data, it is concluded that the photocatalytic gel film 60 is capable of removing airborne organic substances effectively in a condition that the UV fluorescent powder 30 exceeds 5%.

Figure 6:
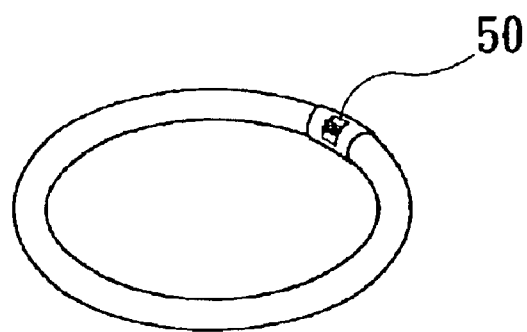
FIG. 6 to FIG. 9 illustrate different shapes of the present invention illuminator.
Figure 7:
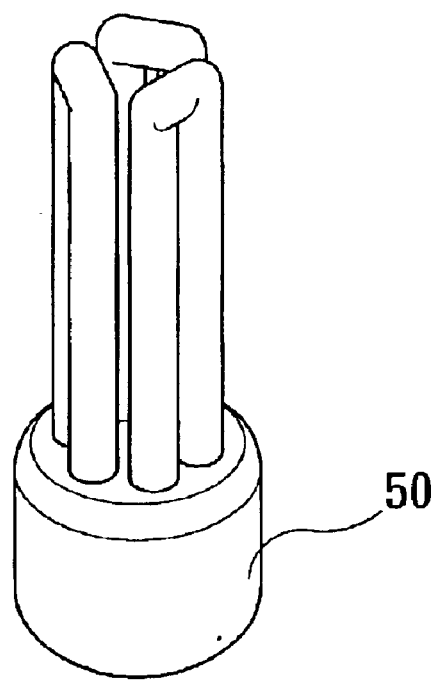
Figure 8:
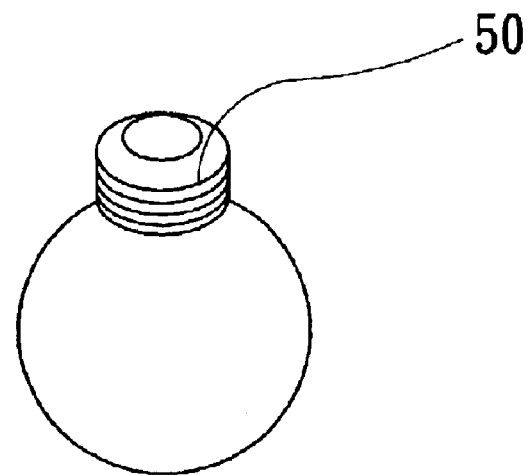
Figure 9:
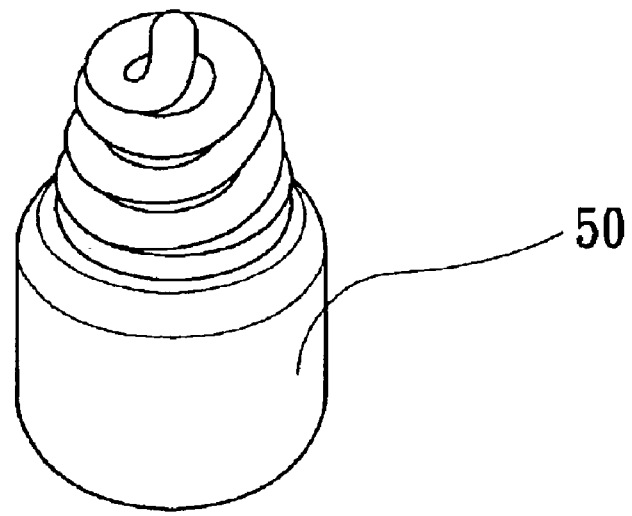

Referring to FIG. 6 to FIG. 9 showing different shapes of the lamp envelope 10. As shown in FIG. 6, the lamp envelope 10 may be annular-shaped. As shown in FIG. 7, the lamp envelope 10 may be U-shaped. As shown in FIG. 8, the lamp envelope 10 may be ball-shaped. As shown in FIG. 9, the lamp envelope 10 may be pillar-shaped or spiral-shaped. In still another case, the lamp envelope 10 may be oval-shaped.

To sum up, the present invention provides an illuminating device capable of purifying air. The illuminator according to this invention not only can provide soft lighting (light can diffused or scattered by the photocatalytic gel film 60), but also can efficiently decompose airborne organic substances. The illuminator of this invention can be used to eliminate unpleasing odor in a room or in an office and also kill bacterium.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An illuminator capable of cleaning air, comprising:
   a transparent lamp envelope having two ends;
   a layer of glue body adhered to inner surface of the lamp envelope;
   visible and UV light fluorescent powders mixed in the layer of glue body;
   electrode bases sealing both ends of the lamp envelope; and
   a photocatalytic gel film coated on outer surface of the lamp envelope.

2. The illuminator capable of cleaning air as claimed in claim 1 wherein the electrode bases seal both ends of the lamp envelope to define a hermetically sealed chamber in which inert gas and vapor mercury are injected.

3. The illuminator capable of cleaning air as claimed in claim 1 wherein the lamp envelope is made of sodium calcium glass.

4. The illuminator capable of cleaning air as claimed in claim 1 wherein the lamp envelope has a wall thickness of 0.3 mm to 1.2 mm.

5. The illuminator capable of cleaning air as claimed in claim 1 wherein the concentration of the visible light fluorescent powder is about 60% to 95% in weight, the concentration of the UV light fluorescent powder is about 5% to 40% in weight.

6. The illuminator capable of cleaning air as claimed in claim 1 wherein the visible light fluorescent powder is selected from the group consisting of $Ca_{10}(PO_4)_6FCl$, Sb, Mn, $\alpha_5(PO_4)_3Cl$, Eu, $BaMg_2Al_{16}O_{27}$, $LaPO_4$, Ce, Tb, and $Y_2O_3$.

7. The illuminator capable of cleaning air as claimed in claim 6 wherein $\alpha$ includes Sr, Ca, and Ba.

8. The illuminator capable of cleaning air as claimed in claim 1 wherein the UV light fluorescent powder is selected from the group consisting of $BaSi_2O_7$, $\beta 3Si_2O_7$, $SrB_4O_7$, Pb, Eu, $YPO_4$, and $\gamma Al_{11}O_{19}$.

9. The illuminator capable of cleaning air as claimed in claim 8 wherein β includes Sr, Mg, and Ba.

10. The illuminator capable of cleaning air as claimed in claim 8 wherein γ includes Mg and Ba.

11. The illuminator capable of cleaning air as claimed in claim 1 wherein the photocatalytic gel film comprises $TiO_2$, $WO_3$, $SnO_2$, ZnO, or $Fe_2O_3$.

12. The illuminator capable of cleaning air as claimed in claim 11 wherein the photocatalytic gel film further comprises Au, Pd, Pt, Ag, Mo, Nb, V, Ce, or Cr.

13. The illuminator capable of cleaning air as claimed in claim 1 wherein the layer of glue body further comprises an excitation material.

14. The illuminator capable of cleaning air as claimed in claim 13 wherein the excitation material is selected from the group consisting of Ba, Sr, Mg, SiO, Pb, Eu, BO, YPO, Ce, La, AlO, Fe, and Li.

15. The illuminator capable of cleaning air as claimed in claim 1 wherein the layer of glue body further comprises butyl acetate, nitrocellulose, surfactants, pure water, and antifoam.

16. The illuminator capable of cleaning air as claimed in claim 1 wherein the lamp envelope is ball-shaped.

17. The illuminator capable of cleaning air as claimed in claim 1 wherein the lamp envelope is pillar-shaped.

18. The illuminator capable of cleaning air as claimed in claim 1 wherein the lamp envelope is spiral-shaped.

19. The illuminator capable of cleaning air as claimed in claim 1 wherein the lamp envelope is U-shaped.

20. The illuminator capable of cleaning air as claimed in claim 1 wherein the lamp envelope is oval-shaped.

21. The illuminator capable of cleaning air as claimed in claim 1 wherein the lamp envelope is annular-shaped.

* * * * *